(12) United States Patent
Karaki et al.

(10) Patent No.: US 7,458,450 B2
(45) Date of Patent: Dec. 2, 2008

(54) IMPACT ENERGY ABSORPTION DEVICE

(75) Inventors: Takuya Karaki, Iyo-gun (JP); Akihiko Kitano, Matsuyama (JP); Shoji Murai, Iyo-gun (JP)

(73) Assignee: Toray Industries, Inc., Tokyo (JP)

( * ) Notice: Subject to any disclaimer, the term of this patent is extended or adjusted under 35 U.S.C. 154(b) by 607 days.

(21) Appl. No.: 10/450,820

(22) PCT Filed: Dec. 17, 2001

(86) PCT No.: PCT/JP01/11031

§ 371 (c)(1), (2), (4) Date: Jun. 18, 2003

(87) PCT Pub. No.: WO02/50449

PCT Pub. Date: Jun. 27, 2002

(65) Prior Publication Data

US 2004/0056469 A1   Mar. 25, 2004

(30) Foreign Application Priority Data

Dec. 18, 2000   (JP) .............................. 2000-383278

(51) Int. Cl.
*F16F 7/12* (2006.01)
(52) U.S. Cl. .................. 188/377; 188/376; 267/139
(58) Field of Classification Search .............. 207/116, 207/139, 140; 188/371, 372, 377; 293/132, 293/133, 135, 136, 137, 154; 404/6; 244/110 A, 244/110 C, 110 F; 256/13.1
See application file for complete search history.

(56) References Cited

U.S. PATENT DOCUMENTS

| | | | | |
|---|---|---|---|---|
| 2,139,642 A | * | 12/1938 | Osolin | 256/13.1 |
| 3,741,560 A | * | 6/1973 | Schaller | 267/134 |
| 3,840,260 A | * | 10/1974 | Wacker et al. | 293/132 |
| 4,576,507 A | * | 3/1986 | Terio | 404/6 |
| 4,844,213 A | * | 7/1989 | Travis | 188/377 |
| 5,547,310 A | * | 8/1996 | Muller | 404/6 |
| 5,732,801 A | * | 3/1998 | Gertz | 188/377 |
| 6,065,738 A | * | 5/2000 | Pearce et al. | 256/13.1 |
| 6,595,502 B2 | * | 7/2003 | Koch et al. | 267/139 |

FOREIGN PATENT DOCUMENTS

JP            17224875      *  8/1995

\* cited by examiner

*Primary Examiner*—Thomas J Williams
(74) *Attorney, Agent, or Firm*—Morrison & Foerster LLP

(57) ABSTRACT

This invention is an impact energy absorption device, in which a long part (1) made of a high strength material is disposed with its lengthwise direction kept different from an impact direction, and both terminals of the long part (1) are connected with columns (2) through upper platens (3) covering the upper faces of the columns (2) kept standing apart from each other with a predetermined distance (L), comprising a structural system, in which a deformation of the long part (1) caused by the impact force applied to it, causes the upper platens (3) to move for compressing or deflecting the columns (2), thereby absorbing the impact energy.

The conventional column type energy absorption member is weak against an impact applied in a direction within a wide angle ($\theta$) such as an impact applied in an oblique direction. However, the energy absorption device of this invention can exhibit an impact energy absorption capability even against an impact applied in the direction within such a wide angle, equivalent or superior to that in the case where it fails in the axial direction. Furthermore, even if the parts used are damaged, they can be easily exchanged to allow restoration as an energy absorption device.

11 Claims, 13 Drawing Sheets

IMPACT ENERGY ABSORPTION DEVICE

TECHNICAL FIELD

The present invention relates to an impact energy absorption device that can be used for transportation equipment in general including motor vehicles such as passenger cars, trucks and light vehicles, aircraft such as passenger planes, ships such as fishing boats and ferry boats, rolling stock such as electric trains, monorail trains and cable cars, and also for dwelling houses and buildings likely to be hit by such transportation equipment.

BACKGROUND ART

As light weight members capable of absorbing the high energy of impact forces applied to the aforesaid transportation equipment and the like, columnar energy absorption members made of an FRP (fiber-reinforced plastic) are disclosed in JP10-235763A, JP11-351305A, etc. These columns are hollow, and are progressively compressed and fail when a compressive force acts in the axial direction of each column, to exhibit high energy absorption capability.

However, in the case where an impact force acts on the column in a direction different from the axial direction, for example, in the direction perpendicular to the axial direction, the energy absorption capability may greatly decline. For example, there is a problem that, for example, in the case where an impact force acts on a lateral side of a motor vehicle, the impact force can cause the motor vehicle per se to spin and collide with another object, directly affecting the movement of the vehicle body, and threatening the life of the driver. It is rare that an impact force always acts in the axial direction of the column like this, and a structural system that can absorb high energy when subjected to an impact force applied at any of various angles is needed.

On the other hand, JP11-334648A discloses an invention, in which an impact force is transferred to a direction different from the direction in which the impact force is applied (hereinafter called "impact direction), for exhibiting sufficient impact energy absorption capability. However, this publicly known technique is structurally complicated, since many impact direction transfer devices exist between the impact force transfer member and the energy absorption member, and an impact direction transfer device that can actually withstand an applied impact force is complicated and hard to function. Even if such a device can be constructed, the members concerned must be stiffened to increase the weight. So, the technique has a problem in view of labor and cost.

In view of the above-mentioned problems, the object of this invention is to 10 provide a novel structural system and device that can reliably exhibit the impact energy absorption capability irrespective of the impact direction, can reduce the damage to transportation equipment for reducing the repair cost of the transportation equipment, and further can protect the lives of passengers.

DISCLOSE OF THE INVENTION

A first embodiment of the impact energy absorption device of this invention is an impact energy absorption device, in which a long part (1) made of a high strength material is disposed with its lengthwise direction kept different from an impact direction, and both terminals of the long part (1) are connected with columns (2) through upper platens (3) covering the upper faces of the columns (2) kept standing apart from each other with a predetermined distance (L), comprising a structural system, in which a deformation of the long part (1) caused by an impact force applied to it, causes the upper platens (3) to move for compressing or deflecting the columns (2), thereby absorbing the impact energy.

A second embodiment of the impact energy absorption device of this invention is an impact energy absorption device, in which at least one hollow or solid column (2) is disposed to substantially surround a long part (1) made of a high strength material, and an upper platen (3) and a lower platen (4) are disposed to keep the upper and lower faces of the column (2) between the platens and to cover the upper and lower faces of the column (2) respectively, comprising a structural system, in which a deformation of the long part (1) caused by an impact force applied to it, causes the upper platen (3) and the lower platen (4) to move in the directions of approaching each other, for compressively deforming the column (2), thereby absorbing the impact energy.

Figure 1:
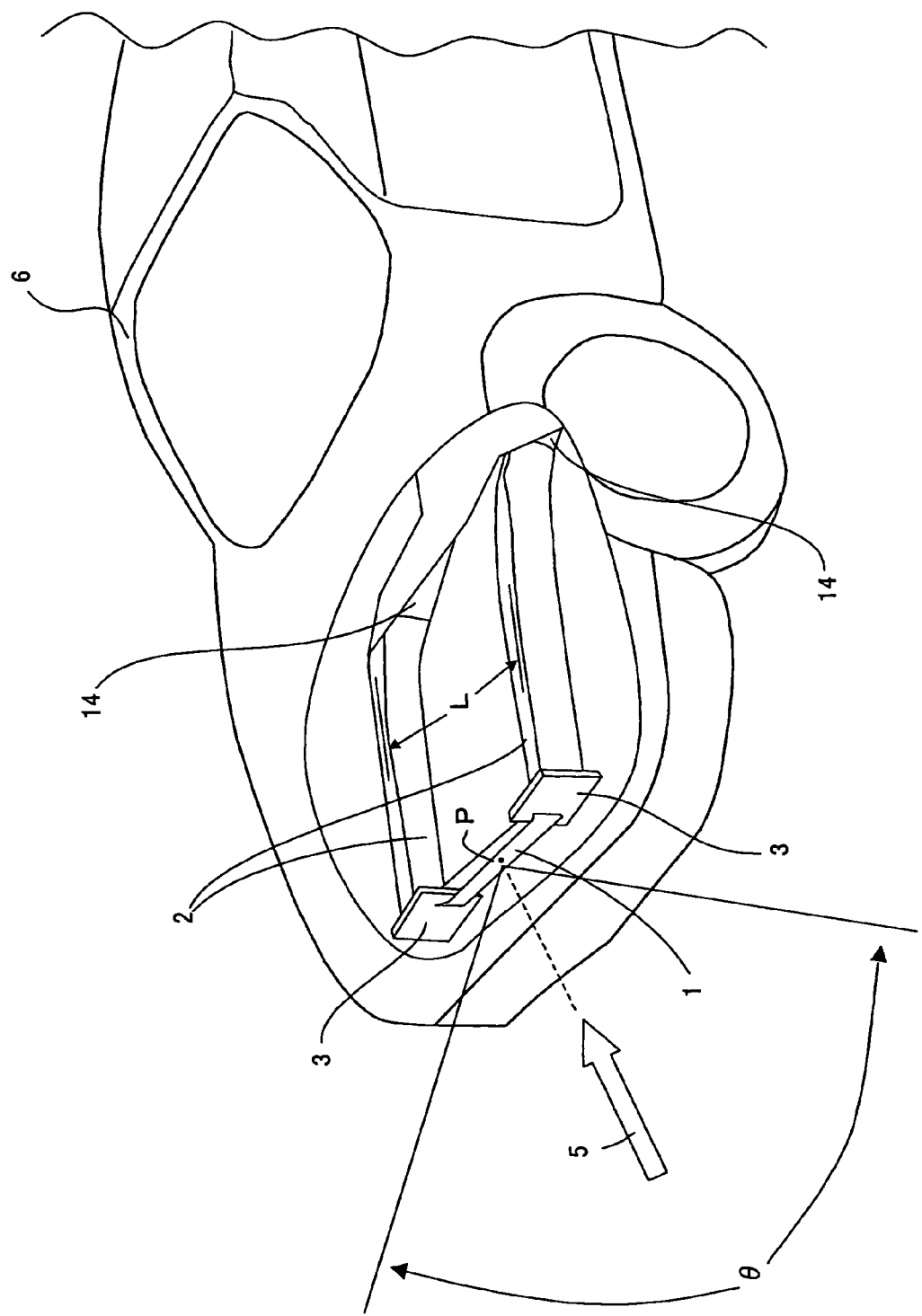
FIG. 1 is a perspective view showing an embodiment of the impact energy absorption device of this invention, used for a motor vehicle.

[Meanings of Symbols]
1: long part
2: column
3: upper platen
4: lower platen
5: impact force 6: carbody
7: lengthwise direction of the long part
8: column having a slit
9: solid column
10: terminal of the long part
11: projection
12: slit
13: frame
14: front side member
15: utility pole (fixed object)
16: car body moving direction
17: axial compression direction of the column 2
P: impact point

THE BEST MODES FOR CARRYING OUT THE INVENTION

The best modes of the impact energy absorption device of this invention are described below in detail in reference to the drawings showing embodiments.

FIG. 1 is a perspective view with a partially cutaway section in which the impact energy absorption device of this invention is used as an impact energy absorption device of a motor vehicle.

In FIG. 1, a long part (1) is shaped like a belt and made of a high strength material such as a metal or FRP, being disposed in such a direction that a certain angle is formed between the lengthwise direction of the long part (the width direction of the vehicle in case of FIG. 1) and the direction of the impact force (5) applied from the front in the arrow direction in front of a car body (6).

Columns (2) are made of a material capable of being deformed by a compressive force for failing, such as a metal or FRP, and in case of FIG. 1, they are fastened to front side members (14) of the car body by adequate means (6) in such a manner that they are kept standing. The columns (2) are not especially limited in form and can be, for example, cylindrical or rectangular-columnar. They can also be either solid or hollow in section. Upper platens (3) are installed to cover the upper faces of the columns (2), and are connected with the long part (1). It is not necessary that the upper faces of the columns (2) are perfectly covered with the upper platens (3), and unless the effect of this invention is impaired, the upper faces can also be virtually covered. In case of FIG. 1, the terminals of the long part (1) are connected with the upper platens (3) in such a manner that the long part passes through the upper platens. In this case, the expression, "virtually covered" means that the upper or lower platen preferably covers more than about 95% of the upper or lower face of each column under any conditions in which this invention is employed (for example, in the case where the impact energy absorption device is installed in transportation equipment, vibration can change the relative position between the column and the upper or lower platen, and even in this condition, the upper or lower platen should cover more than about 95%). The "upper face" and "lower face" means both the end faces of each column in the lengthwise direction. Since the concept of upper face and lower face depends on the viewpoint from which the column is seen, the upper face and the lower face can also be interpreted reversely as the lower face and the upper face.

Figure 2:
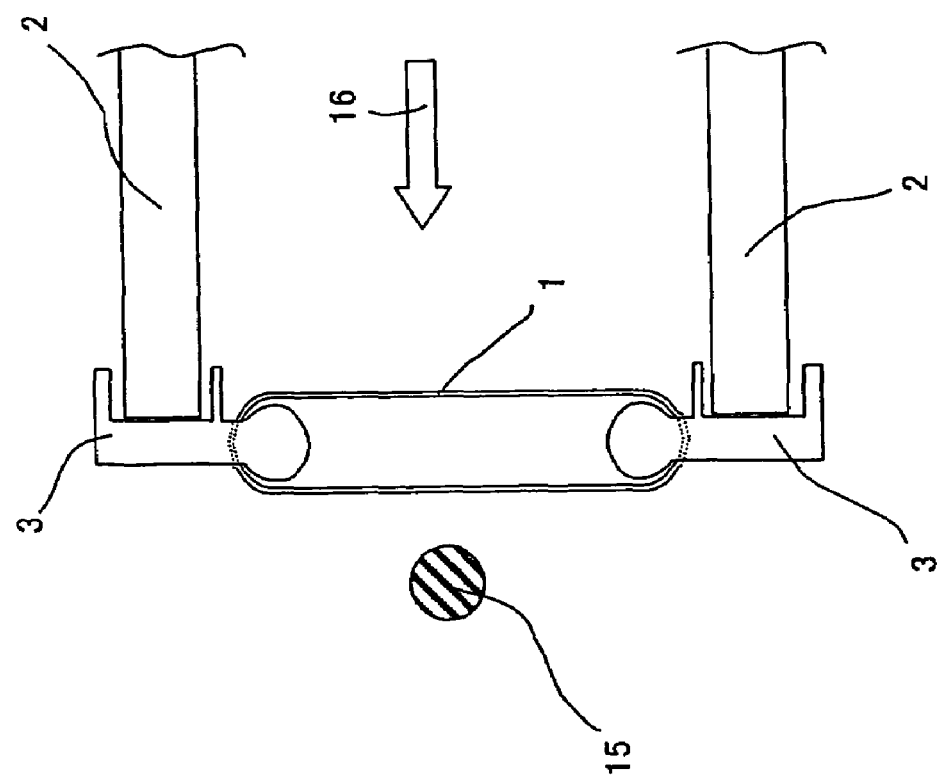
FIG. 2 is a partial plan view showing the vicinity of the colliding portion of the impact energy absorption device shown in FIG. 1.
Figure 3:
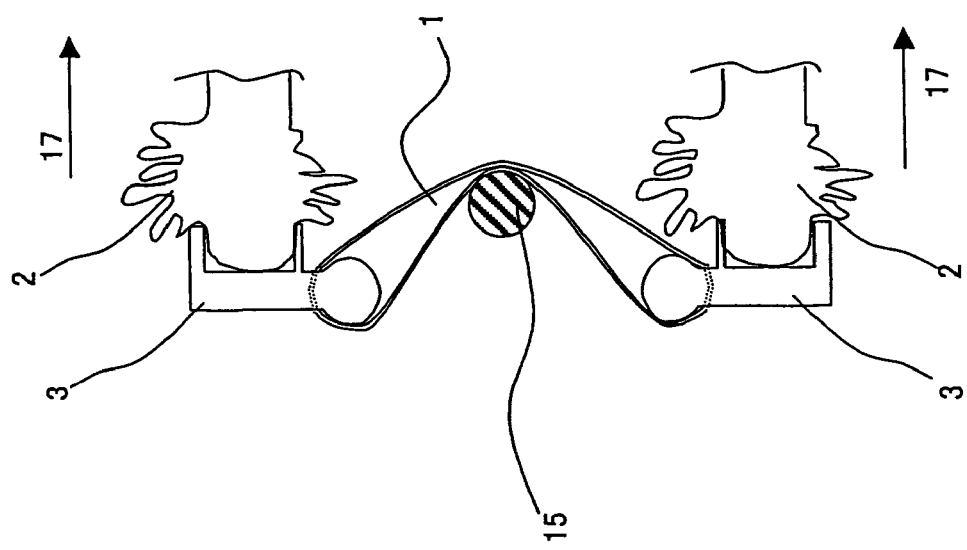
FIG. 3 is a typical view showing a scene where the impact energy absorption device of FIG. 1 collides with a utility pole 15.

FIG. 2 is a partial plan view showing some parts near the long part (1) illustrated in FIG. 1 from top. FIG. 3 is a drawing showing how respective parts are deformed when an impact force is applied in the arrow (5) direction in FIGS. 1 and 2.

In the drawings, if the car body runs in the arrow (16) direction of FIG. 2 and collides head-on with a fixed object (15) such as a utility pole, and the impact force acts on the long part (1), then the belt-like long part (1) is deformed as shown in FIG. 3, while the pair of upper platens (3) are entirely moved in the axial compressive direction (arrows 17 of FIG. 3) of the columns (2). The upper platens (3) axially compress the columns (2) as shown in FIG. 3, causing them to fail, and simultaneously absorb the impact energy.

Also in the prior art, an impact energy absorption device having a cylinder as a front side member of a car body is known, for example, in JP10-235763A, and it is effective only in such a collision as a head-on collision with a wall surface, in which the impact force directly acts on the cylinder in the axial direction of the cylinder. In the case where the center of the car body collides with a thin cylinder like a utility pole, the impact force does not act on the cylinder, and the cylinder cannot play the role of absorbing the impact energy. An idea of transmitting the impact force for absorbing the impact energy is disclosed also in JP11-334648A, but in this publicly known technique, there is another member (a skeleton in the publicly known technique) between the long part (1) (expressed as an impact force changing member in the publicly known technique) and the upper platen (3) (a disc or the like in the publicly known technique). In the present invention, the long part (1) and the upper platen (3) are directly connected with each other to simplify the entire device and to reduce the weight, and also to efficiently convert the impact force, for axially compressing the columns (2), causing them to fail (the publicly known technique describes this action as actuating the energy absorption means).

Figure 4:
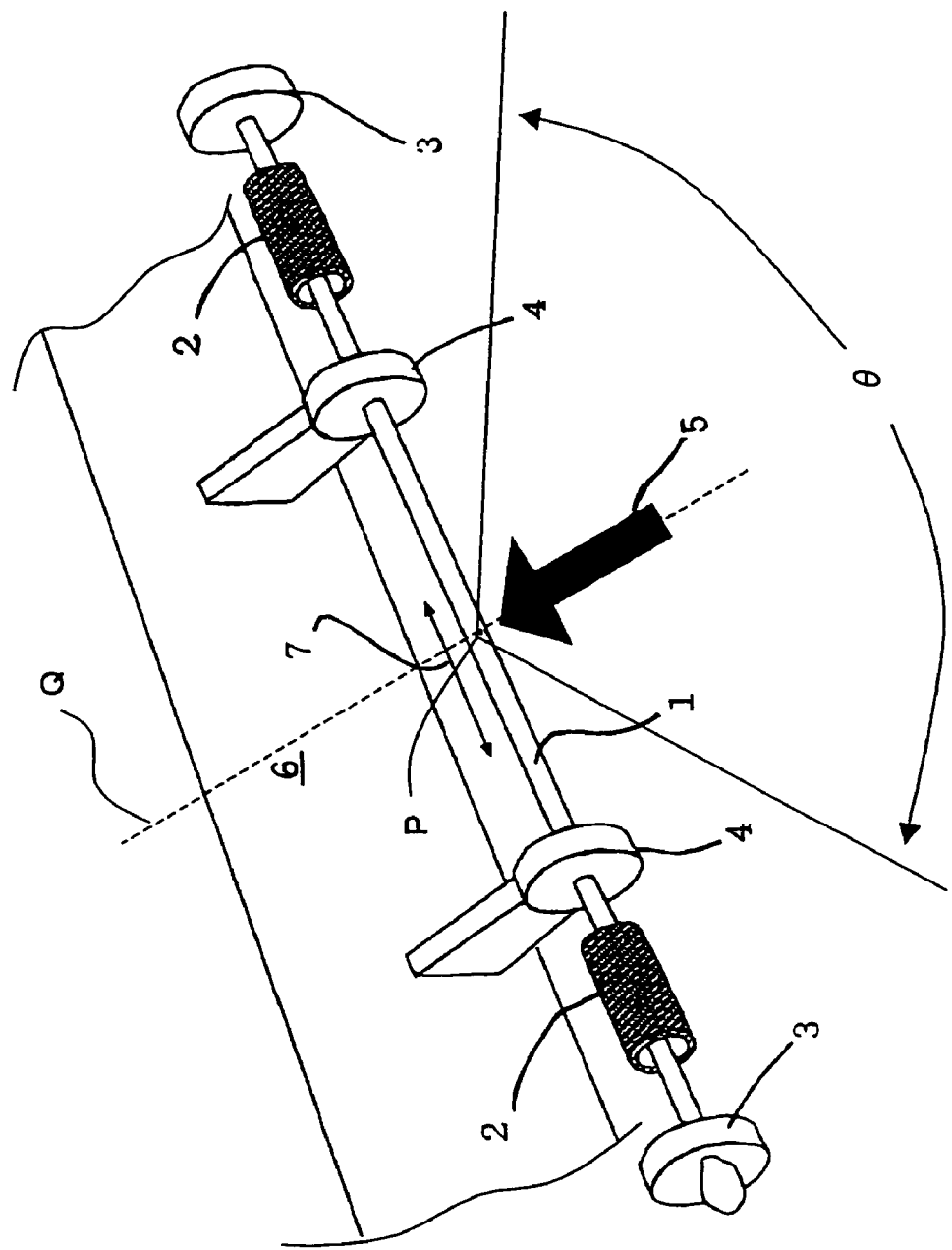
FIG. 4 is a perspective view showing an important portion of the impact energy absorption device of this invention as an embodiment different from that of FIG. 1.

FIG. 4 shows an embodiment of the impact energy absorption device of this invention different from that of FIGS. 1-3. This device is also used as an impact energy absorption device in preparation for a collision at a lateral face such as a door of a car body.

The long part (1) with the same constitution as described above is disposed in such a direction that a certain angle is formed between the lengthwise direction of the long part (the longitudinal direction of the motor vehicle in case of FIG. 4) and the direction of the impact force (5) shown by a closed arrow, acting on a lateral side of the car body (6).

The columns (2) are cylinders made of a material capable of being compressively deformed and failing, such as a metal or FRP, and are disposed to keep the long part (1) between them. In this embodiment, the long part (1) passes through the columns (2), and the columns (2) perfectly surround portions of the long part (1).

Near the upper and lower faces of the columns (2), upper platens (3) and lower platens (4) are disposed to cover the upper and lower faces respectively. The "upper face" or "lower face" refers to either of both the end faces of each column (2). In FIG. 4, the upper platens (3) are shaped like discs larger in diameter than the columns, and the long part (1) passes through the holes formed about the centers of the upper platens (3). The lower platens (4) are metallic discs welded and fixed to the inside of a door of the motor vehicle and larger in diameter than the columns (2), and the long part (1) passes through the circular holes of the lower platens (4) as it does through the upper platens (3).

Figure 5:
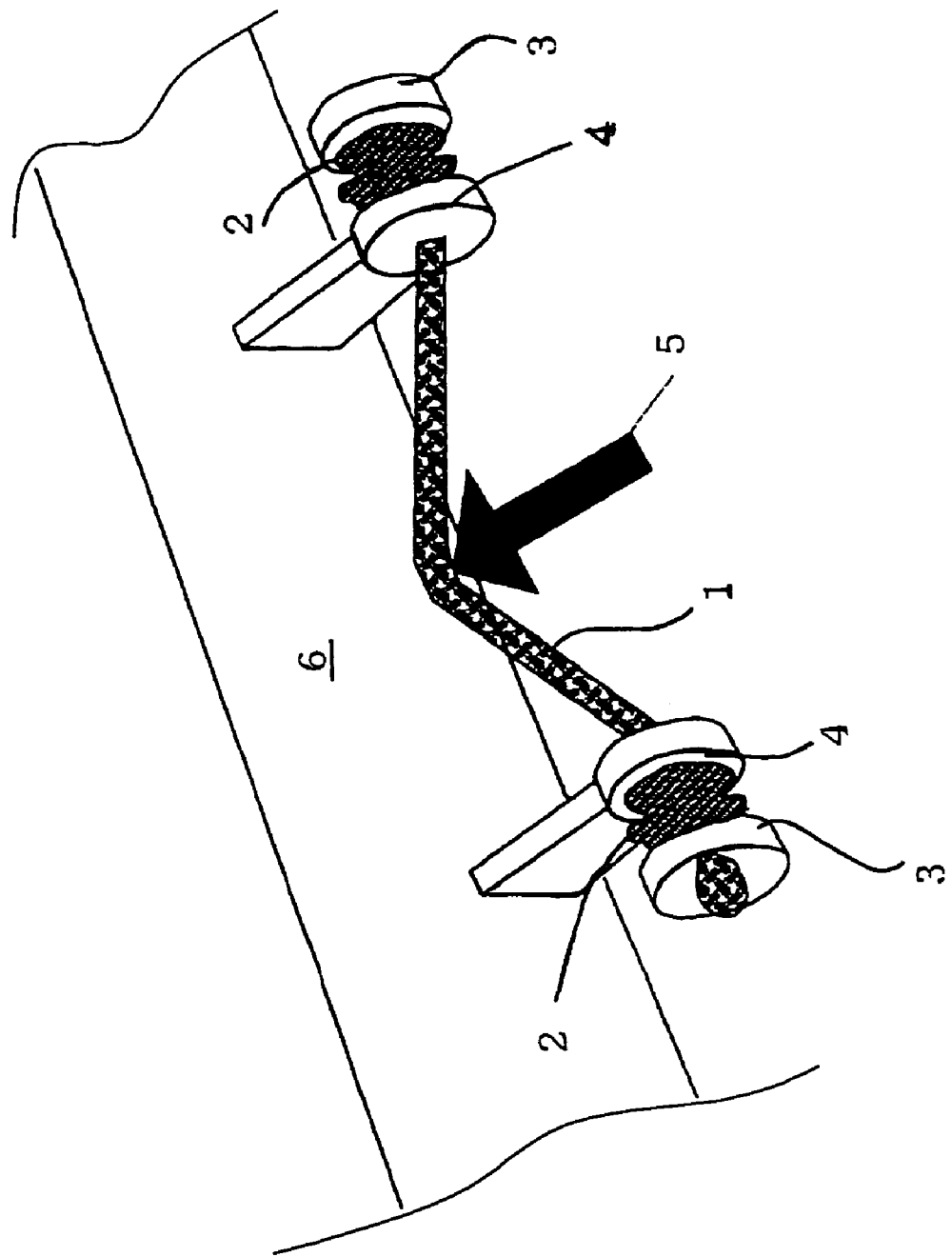
FIG. 5 is a typical view where the impact energy absorption device of this invention of FIG. 1 is subjected to an impact.

If a collision at a lateral face causes an impact force to act on the car body in the direction Q perpendicular to the lengthwise direction of the long part (1), as shown in FIG. 5, the long part (1) is displaced toward the interior, and simultaneously contracts in the lengthwise direction. In this case, the upper platens (3) and the lower platens (4) move in the directions of approaching each other. That is, the upper platens (3) and/or the lower platens (4) move in the directions of approaching each other, and the columns (2) are compressively deformed in their own axial direction between the upper platens (3) and the lower platens (4), and if the impact force increases, the columns (2) compressively fail to absorb the impact energy. After the columns (2) compressively fail, the long part (1) is further deformed toward the interior, and the deformation and failure of the long part (1) per se absorb the energy. That is, in this invention, the failure of the columns (2) per se and the deflective and tensile failure of the long part (1) per se absorb the impact energy in two stages, thus being able to absorb very large energy. "The upper platens (3) and/or the lower platens (4) move in the directions of approaching each other," described above, means that both the upper platens (3) and the lower platens (4) move or either the upper platens (3) or the lower platens (4) move so that the upper platens (3) and the lower platens (4) approach each other relatively. In FIG. 4, the impact force acts on the car body in the direction Q perpendicular to the car running direction, but even if the impact force acts in the non-perpendicular direction, for example, in the direction deviating within a range of θ, the impact energy absorption effect can be exhibited.

Furthermore, the deformation and failure of the upper platens (3) and the lower platens (4) can absorb further energy. In this way, even if an impact force is applied in a different direction, slight displacement can reliably absorb very high energy.

In the above-mentioned device of this invention, preferred modes of respective parts are described below in detail. The long part (1) plays the role of transmitting an impact force to the upper platens (3), the lower platens (4) and the columns (2) respectively described later, and it is preferred that the long part (1) should have a sufficient strength to compressively deform the columns for causing them to fail. So, the long part (1) must be made of a high strength material such as a metal or FRP. The high strength material is not especially limited if it has a relatively high strength. Particularly a high tensile strength steel, FRP containing inorganic fibers such as carbon fiber reinforced plastic (CFRP) or glass fiber reinforced plastic, or FRP containing organic reinforcing fibers such as aramid fibers or nylon fibers can be used. It is preferred that the long part has a form capable of being easily deformed, such as a rope, wire, braid, belt, sheet, tube or the like. A long part formed like a rope, tube or belt is especially preferred. Since the long part can be easily deformed, it can efficiently transmit an impart force applied in any of various directions to the columns (2), and can reliably absorb the impact energy more efficiently when an impact is applied in any of the many possible directions peculiar to the transportation equipment.

Especially it is preferred that the long part is a metallic rope, since it can be deformed and is resistant against rubbing. Even if it is held between a panel and an interior material or the like as a result of a collision, it can be deformed without being broken, to transmit the impact force to the columns.

Moreover, it is also preferred that the long part is a rope, cable, wire or braid, since it can convert an impact force into a tension for transmitting the tension to the columns, for absorbing the energy more efficiently. As the rope, a strand rope is preferred, since it is flexible and excellent in handling. Furthermore, a spiral rope, locked coil, semi parallel wire cable (SPWC) or the like is preferred, since they can have sockets attached at their terminals. A stainless steel rope is also preferred, since it is excellent in decorative effect and corrosion resistance, though it is expensive.

A belt-like FRP obtained by forming glass fibers or carbon fibers like a seamless loop is also preferred, since it can be deformed and can retain its shape. Especially a belt composed of carbon fibers is especially preferred, since the belt per se fails due to tension further after the columns (2) fail, allowing more impact energy to be absorbed.

It is preferred that the long part is long enough to ensure that the impact force acts on the long part at first. It is preferred that the length of the long part corresponds to 5 times or more of its thickness. A length corresponding to 10 times or more of the thickness is more preferred. The upper limit of the length depends on the size of the transportation equipment, and it can be said that the upper limit is the circumference of the transportation equipment. Particularly it is preferred that the upper limit is 10 cm to 100 m.

In order that the long part per se can be deformed and fail for absorbing the energy, a cylinder made of a high strength material such as high tensile strength steel or another metal having a strength of 1 GPa or more or a fiber reinforced plastic (FRP), or a modified cylinder formed by flattening portions such as the ends of a cylinder to allow connection or fastening to another member is preferred, since it is excellent in plastic deformation capability. If the long part is made of a metallic material, an impact force in any of various directions can bend the long part, causing it to be plastically deformed. So, the long part can transmit the impact force to the columns.

The long part transmits an impact force to the columns and the upper and lower platens. In order that the energy is absorbed not only by the compressive deformation but also by the compressive failure of the long part, it is preferred that the tensile failure load of the long part is larger than the compressive failure load of the columns (not the strength of the material, but the load acting when the columns are compressed in the axial direction).

However, considering the possibility that the long part may fail first due to rubbing or the like, it is preferred that the tensile failure load of the long part is 1.1 times to 30 times the compressive failure load of the columns. If the tensile failure load is larger than the aforesaid range, the long part becomes so strong that a heavy device is designed.

For the same reason, it is preferred the failure load of the upper platens (3) and the lower platens (4) is also larger than that of the columns. It is preferred that the failure load of the platens is 1.1 times to 50 times the compressive failure load of the columns (2). Furthermore, it is more preferred that the failure load of the upper platens (3) and the lower platens (4) is larger than the failure load of the long part, since the impact energy absorption device as a whole lets the columns (2) absorb the impact energy when they fail, and subsequently lets the long part (1) absorb further impact energy when it fails. It is preferred that the compressive failure load of the upper platens (3) and the lower platens (4) is 1.1 times to 20 times the tensile failure load of the long part (1).

It is preferred that the columns (2) are cylinders or solid shafts made of a metal or FRP as described above, and depending on the configuration of the entire device, the columns can be disposed to surround the long part (1). Particular shapes of the columns include a thin metal of aluminum or steel (JP48-51079A), FRP honeycomb, and the cylinder, FRP or plastic square rod, or I-shaped, C-shaped or cross-shaped channel respectively described in JP6-346935A. They can be compressed in the axial direction and deformed to fail, for absorbing the energy. Thin metal columns can be compressively buckled and plastically deformed for absorbing larger energy, and FRP columns containing a tapered trigger each can be progressively compressed to fail for absorbing larger energy. The trigger refers to a shape changing in thickness in the axial direction of the column (see said JP10-235763A).

The columns can be easily removed, and if they fail due to an impact, they can be exchanged for new ones, to restore the original impact absorbing capability. Furthermore, since the energy absorption capability can be controlled merely by changing the number and size of the columns in response to the grade of transportation equipment (for example, the model of the motor vehicle), they can be provided as modules as a feature.

In this invention, an "FRP" refers to a material consisting of reinforcing fibers and a matrix resin. The reinforcing fibers are not especially limited, but glass fibers, carbon fibers and organic fibers such as Kevlar fibers are preferred, since they are balanced between strength and stiffness. Furthermore, an FRP with a fiber volume fraction (Vf) of 30% to 80% is preferred, since it is balanced between impact energy absorption and weight.

On the other hand, the matrix resin is not especially limited, but thermosetting resins such as epoxy resins, polyester resins, vinyl ester resins and phenol resins are preferred, since they are excellent in moldability. Thermoplastic resins such as nylon, polypropylene, polyethylene and acrylic resin are also preferred, since they are excellent in energy absorption capability.

Furthermore, if each column is internally partially or wholly packed with a macromolecular material such as rubber or foam, paper, wood or the like, the energy absorbed when the column is compressively deformed can be delicately controlled.

Figure 6:
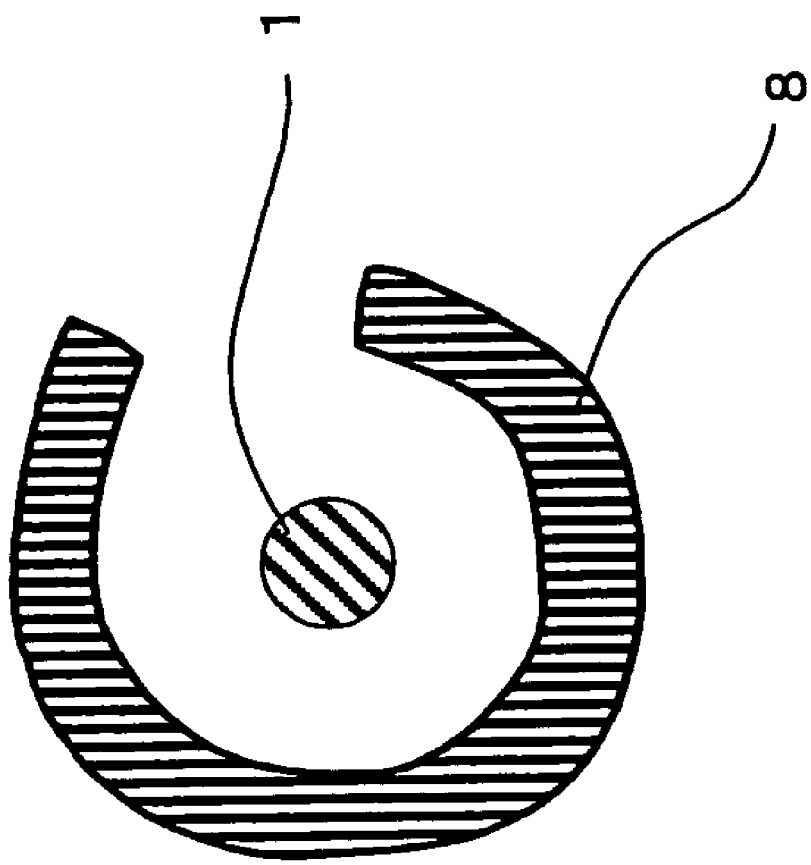
FIG. 6 is a cross sectional view showing the long part and one of the columns in the impact energy absorption device of this invention.
Figure 7:
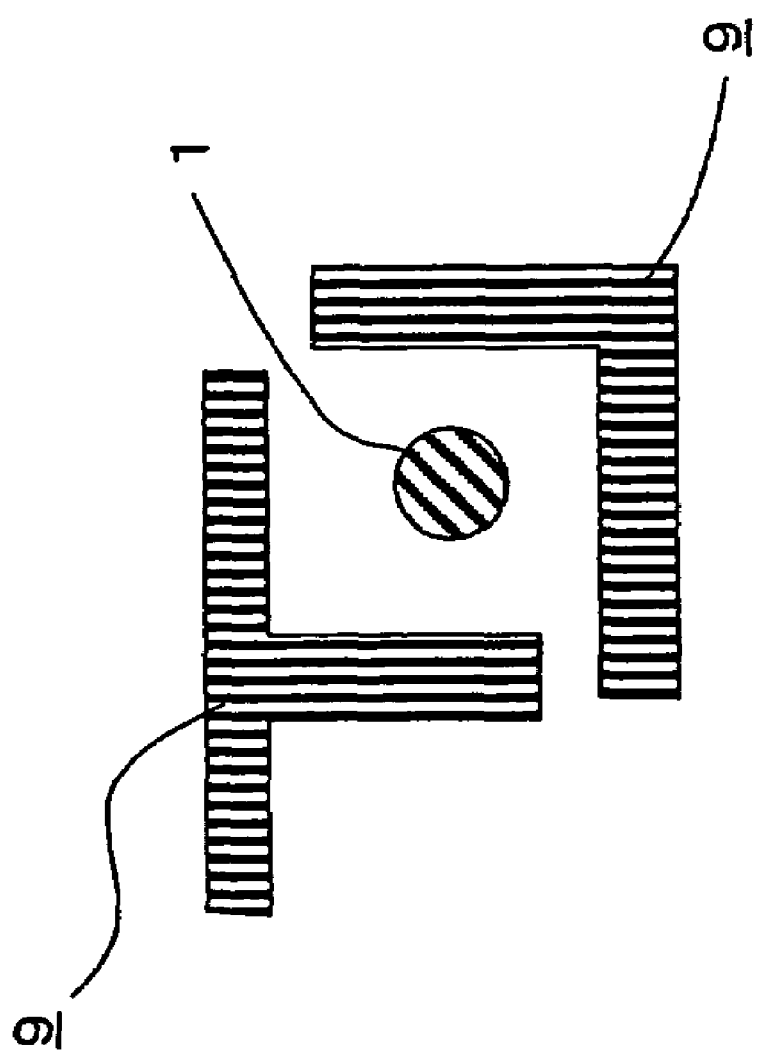
FIG. 7 is a cross-sectional view showing the long part and one of the columns in the impact energy absorption device of this invention as an embodiment of the column different from that of FIG. 6.
Figure 8:
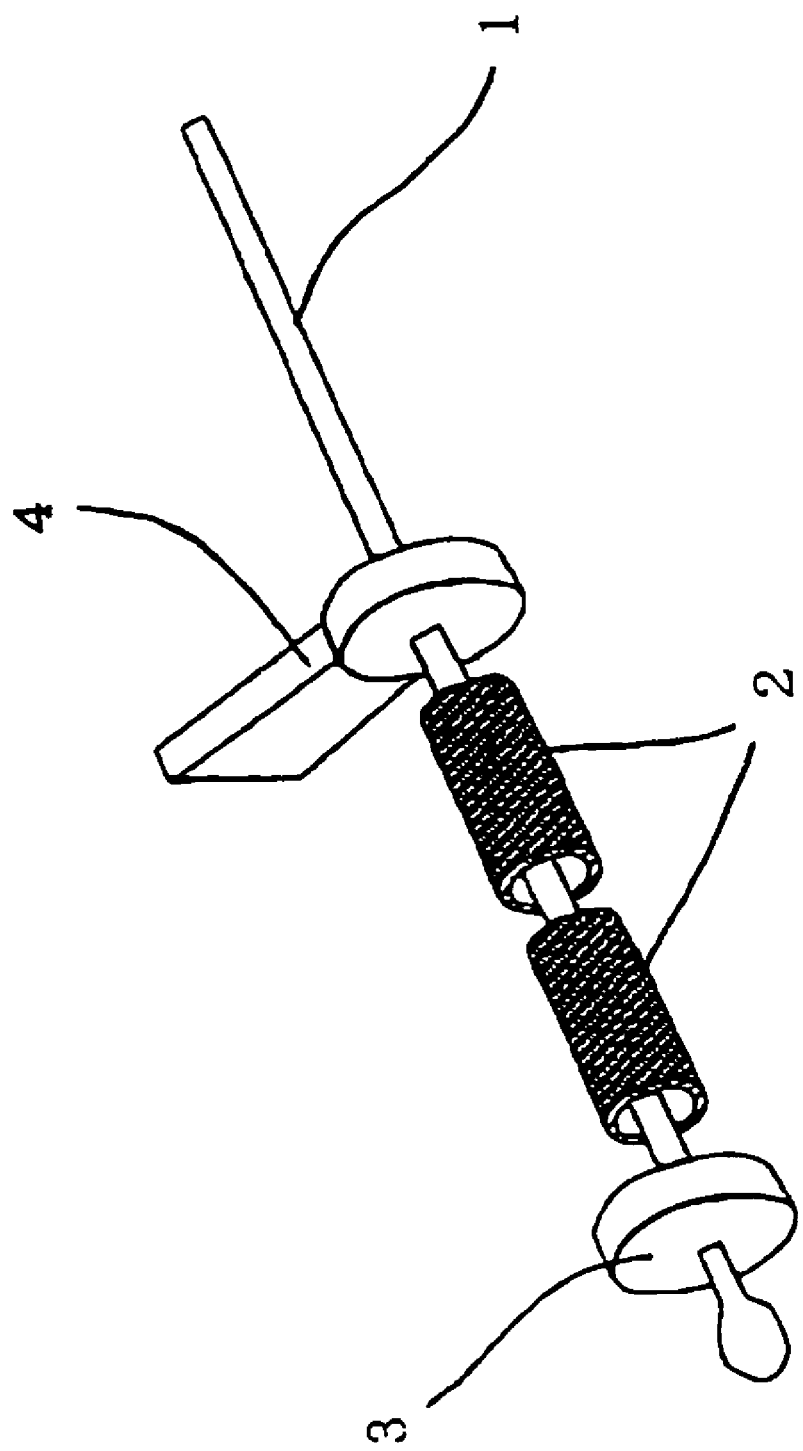
FIG. 8 is a perspective view showing an important portion of the impact energy absorption device of this invention, wherein two columns are installed between a pair of platens.

"Substantially surrounding the long part (1)" does not mean that the long part must pass through the columns without fail, but means to include the case shown in FIG. 6, in which a column with a slit surrounds the long part, and the case shown in FIG. 7, in which one or more L-shaped or T-shaped articles are disposed around the long part. The columns shown as examples in FIGS. 6 and 7 have an opening in the cross sectional form. So, compared with a column closed in cross sectional form such as a cylinder, they allow easy removal and exchange, and are preferred for the transportation equipment that must be frequently repaired. Moreover, as shown in FIG. 8, plural identical or different columns can also be installed between each pair of platens. If different columns are disposed or the number of columns is adjusted, the energy absorption can be adjusted and the impact load can be controlled. FIG. 8 shows an example, in which two cylinders are disposed in series. Of course, different cylinders can be connected with each other or can be disposed concentrically.

As shown in FIG. 5, receiving the force from the long part (1), the upper columns (3) move to compressively deform the columns (2). The upper platens (3) are also made of a metal or FRP, but lest the upper columns should fail before the columns do, it is desirable that the failure load of the upper platens is larger than that of the columns. Furthermore, it is desirable that the thickness of the upper platens (3) is smaller than the height of the columns, for the purposes of saving the space and increasing the energy absorption. The size of the upper platens must almost perfectly cover the end faces of the columns for compressively deforming the columns. If the upper columns cover the end faces of the columns, they can transmit the force to the columns as a whole, and can reliably compressively deform them for letting them fail, thus allowing the energy absorption to be increased. Moreover, it is preferred that the end faces and the upper platens contact each other in planes, but the upper platens and the columns can also have rugged faces, projections, grooves, notches or the like for fixing the positional relation between them or for inhibiting sliding, to ensure that the force can be transmitted at adequate positions. Still furthermore, the upper platens (3) and the columns can also be integrated.

Figure 9:
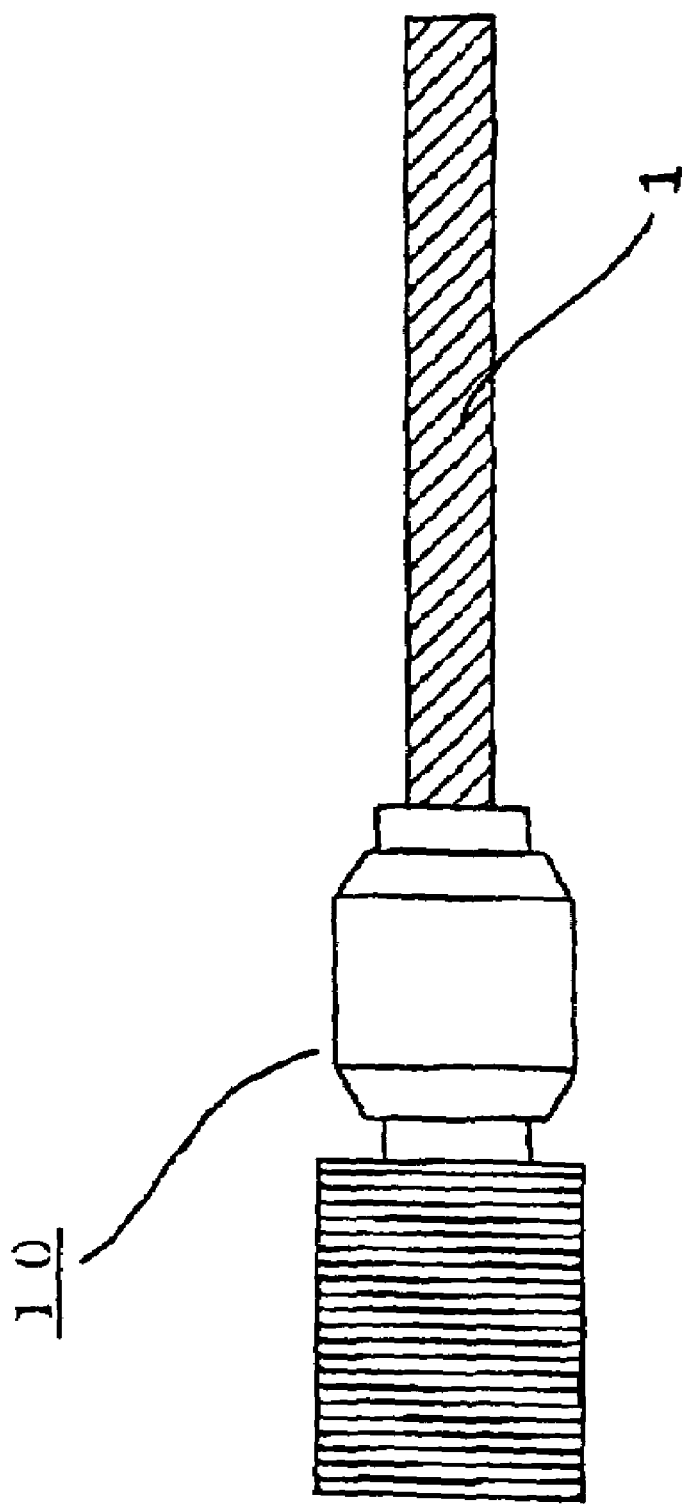
FIG. 9 is a typical view where the long part of the impact energy absorption device of this invention is treated at one of its terminals.

The upper platens (3) can also be integrated with the long part. For integration, as shown in FIG. 9, the long part (1) can be processed at their terminals (10), to have screw end clamps, eye end clamps, Joe end clamps, Shinko clamps, closed sockets, open sockets, DINA anchors or the like for threaded connection, welding or fusion bonding. Of course, the upper platens integrated with the columns can also be further integrated with the long part.

Figure 10:
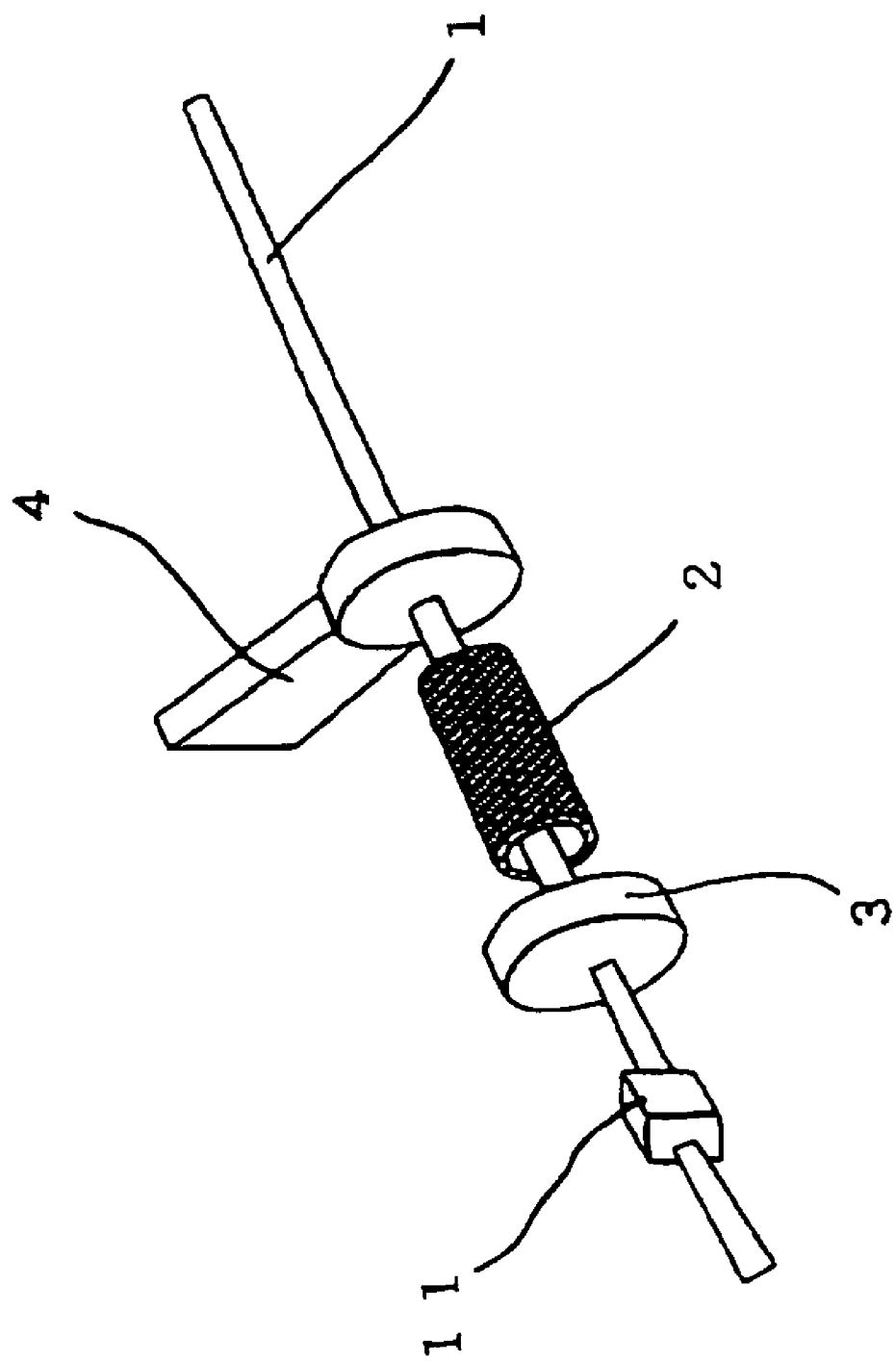
FIG. 10 is a perspective view showing how the forces of the long part and the upper or lower platen are transferred in the impact energy absorption device of this invention.

As for the structural system for transmitting the force from the long part to the upper platens, it is effective to fasten the long part to the upper platens by means of welding, fusion bonding or the like, or to fix using an adhesive. Furthermore, the long part can be crushed at the terminals, or as shown in FIG. 10, projections (11) can be formed at the terminals or other portions of the long part, to ensure that the projections contact the upper platens for transmitting the force. Moreover, the long part can also be thread-connected with the upper platens. This method has an advantage that even in the case where the long part changes in length due to creep or thermal deformation, the distance between both the upper platens can be easily adjusted.

Figure 11:
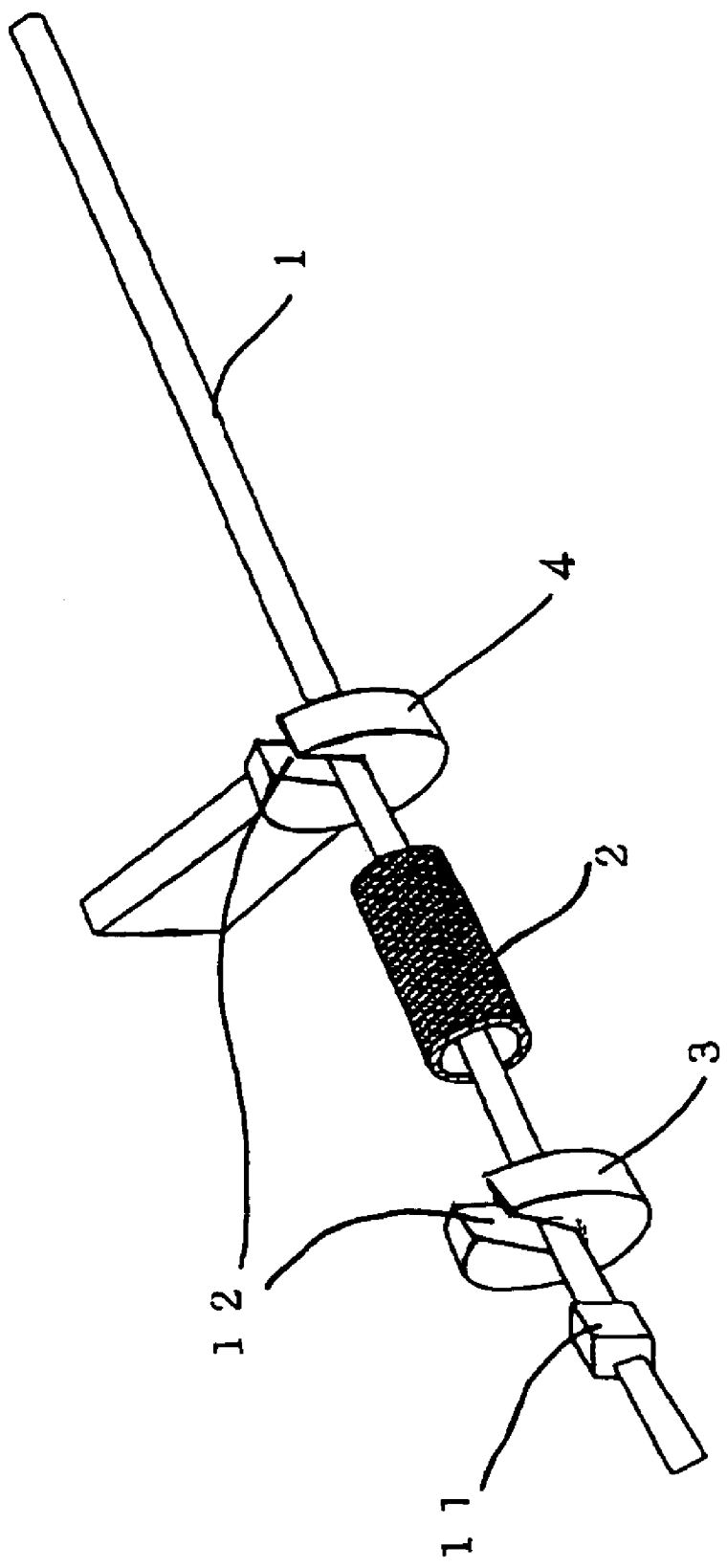
FIG. 11 is a perspective view showing an embodiment of the upper or lower platen of the impact energy absorption device of this invention.

A preferred structural system for transmitting the force from the long part to the upper platens can be selected in view of space saving and desired reliability. In the case where the transportation equipment is a motor vehicle, since the parts must be exchanged very frequently, threaded engagement is most preferred because of easy assembling. Furthermore, to facilitate the exchange of the upper platens, a slit (12) or the like can be formed in each upper platen as shown in FIG. 11.

The lower platens (4) must cover the end faces of the columns (2) almost perfectly like the upper platens (3), since they compressively deform the columns together with the upper platens. If the lower columns cover the end faces of the columns, they can transmit the force to the columns as a whole, allowing the energy absorption of the columns to be increased. Moreover, it is preferred that the end faces of the columns and the lower platens contact each other in planes, but the lower platens and the columns can also have rugged faces, projections, grooves, notches or the like for fixing the positional relation between them or for inhibiting sliding, to ensure that the force can be transmitted at adequate positions. Still furthermore, the lower platens (4) and the columns can also be integrated. For integration, welding, adhesion, fusion bonding, threaded connection or the like can be employed.

As for the structural system for transmitting the force from the long part to the lower platens, as shown in FIGS. 4 and 5, the upper platens (3) can be moved toward the lower platens (4) fixed to a car body or the like. That is, the upper platens (3) contact the columns that further contact the lower platens (4) fixed in position. In this case, the lower platens are fastened to a car body by means of welding, fusion bonding, threaded connection or the like. The lower platens are not fixed to the long part, and the long part passes through the holes of the lower platens (4). Therefore, the upper platens (3) and the columns (2) are moved with the lower platens (4) as guides. The long part is not required to pass through the holes of the lower platens, and for example as shown in FIG. 11, the long part can pass through the slits (12) of the lower platens.

As the structural system for transmitting the force from the long part to the lower platens, as in the case of the upper platens of FIG. 10, it is also allowed that the lower platens are not fixed to the car body or the like, but can be moved toward the upper platens, with the force from the long part received by the projections (11) or the like formed around the long part, for compressively deforming the columns together with the upper platens.

Figure 12:
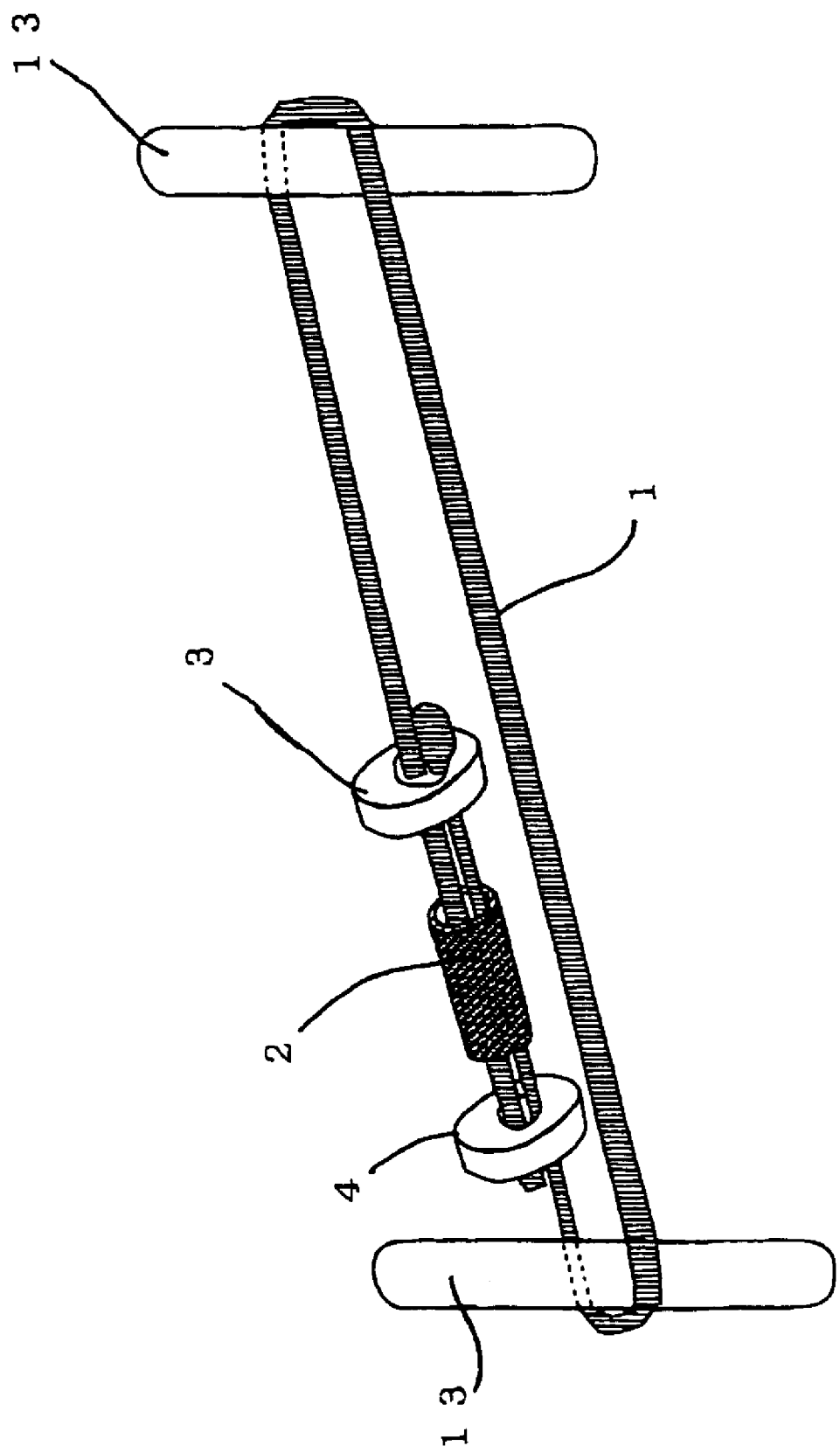
FIG. 12 is a perspective view showing an example where the column, the upper platen and the lower platen are disposed in the impact energy absorption device of this invention.
Figure 13:
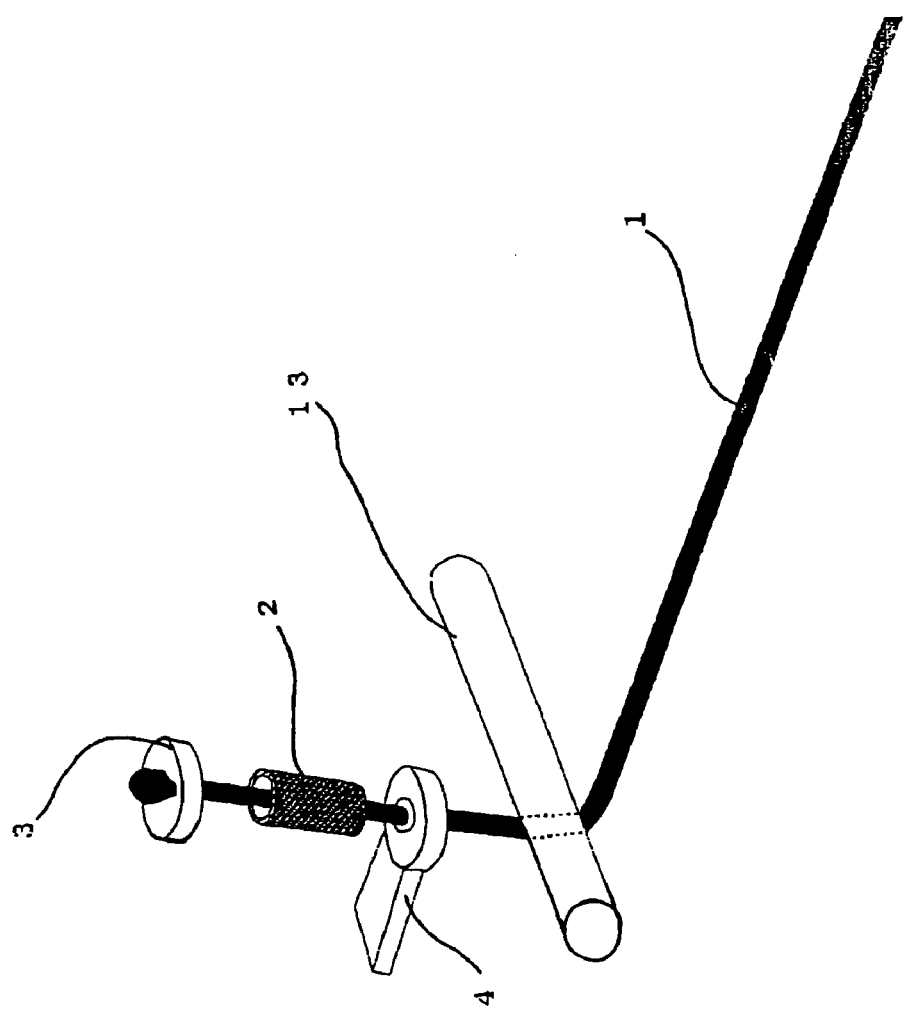
FIG. 13 is a perspective view showing an example where the column, the upper platen and the lower platen are disposed in the impact energy absorption device of this invention as an embodiment different from that of FIG. 12.

As regards the positional relation of the long part, the columns, the upper platens and the lower platens, in FIG. 4, the upper platens (3), the columns (2) and the lower platens are disposed in this order from the terminals of the long part. However, in FIG. 12, the long part (1) forms a loop and does not have terminals, and it is only required that a column (2) is positioned between an upper platen and a lower platen. Furthermore, it is not required that these parts are positioned in one plane, and as shown in the example of FIG. 13, they can also be disposed three-dimensionally. In this example, the long part is bent to allow effective use of space. This example is suitable, for example, for a door of a motor vehicle.

All or some of the parts of the above-mentioned energy absorption device can be protected with a resin or rubber film, or shims or the like can be used between the respective parts for the purpose of reducing the vibration or the like. They can also be machined to have holes or the like for connection with other parts or other members of the transportation equipment, and can also be painted or coated.

The impact energy absorption device of this invention can be suitably installed in transportation equipment.

Furthermore, the energy absorption device can also be combined with other identical devices for constructing a large energy absorption system or a multi-purpose apparatus.

EXAMPLES

Examples of the impact energy absorption device of this invention are described below.

Example 1

As the long part (1) of the device of this invention shown in FIG. 1, used was a belt-like long part (length 960 mm, width 50 mm, thickness 0.3 mm, unit mass 0.31 kg/m, strength 57 kN, tensile modulus of elasticity 140 GPa) obtained by immersing carbon fibers into an epoxy resin and seamlessly forming them according to the filament winding method.

Both the ends of the belt-like long part were passed through steel cylinders with a diameter of 20 mm, and the ends of the cylinders were welded to the gap-side ends of U-shaped steel upper platens (3) (50×50 mm, 10 mm thick), for connecting the long part with the upper platens.

The upper platens were fitted on the upper faces of the front side members (14) of a vehicle (6) imitating a car body, for substantially covering them. The front side members were CRFP cylindrical columns (2) (thickness 2 mm, outer diameter 40 mm, height 80 mm, reinforced by carbon fibers with an axially compressive failure load of 36 kN, having a taper made of an epoxy resin) formed according to the filament winding method and installed symmetrically on both sides of the car body.

The vehicle (6) provided with the impact energy absorption device was made to collide with a steel cylinder (15) with a diameter of 10 cm imitating a utility pole at a speed of 64 km per hour, to ensure that the center of the vehicle collided with the steel cylinder as shown in FIG. 2. As a result, as shown in FIG. 3, in the process in which the belt-like long part (1) collided with the steel cylinder (15) and was deformed, the upper platens (3) progressively compressed the CFRP cylindrical columns (2), to let the CFRP cylinder absorb the impact energy, and it did not happen that the steel cylinder reached the vehicle proper. The impact energy absorbed by the impact energy absorption device installed in the vehicle was 160 kJ in total.

Example 2

As the long part (1) of the device of this invention shown in FIG. 4, a steel strand rope (length 960 mm, rope diameter 9 mm, strand diameter 1.03 mm, standard cross sectional area 39.4 mm², unit mass 0.33 kg/m, strength 57 kN, tensile modulus of elasticity 140 GPa) was processed to have screw end clamps (length 50 mm, diameter 20 mm) at both the terminals.

Both the terminals of the long part were passed through the through holes (diameter 40 mm) of a pair of steel disc-like lower platens (4) (thickness 10 mm, diameter 70 mm) (distance between them 650 mm) welded and fixed to a steel frame imitating a car body, to ensure that both the screw end portions protruded outside the lower platens by almost the same length.

Then, between the lower platens and the screw end portions, FRP cylinders (thickness 2 mm, outer diameter 40 mm, height 80 mm, reinforced by carbon fibers with an axial compressive failure load of 36 kN and having a taper made of nylon resin) formed by the filament winding method were placed as columns (2), to have the long part (1) passed through the cylinders, so that the columns (2) surrounded the long part (1).

Subsequently, disc-like steel upper platens (3) (thickness 10 mm, diameter 70 mm) with through thread ridges (20 mm) at the center were thread-connected with the thread ridges of the screw end portions. The upper platens were rotated in the direction of moving toward the lower platens, for tightening and arresting the columns (2) between the upper platens and the lower platens. In this state, tension acted on the long part, and there was no relaxation.

At the center of the long part of the device having the above-mentioned impact energy absorbing structural system, a hammer impact with an energy of 2200J (hammer speed 36 km/h) was applied in pendulum motion in the direction of 60 degrees against the lengthwise (axial) direction of the long part.

As a result, the columns (2) only were progressively compressed and failed, stopping the hammer.

Comparative Example 1

One of the columns (cylinders) used in Example 2 was fixed to a frame imitating a car body, and as described for Example 2, a hammer impact of 2200 J was applied in the direction of 60 degrees against the axial direction of the cylinder. The column was split into two portions at about the portion fixed to the frame due to shear failure, and the hammer did not stop and swung through. The energy absorption calculated from the angle of the hammer remaining after swinging was as slight as 100 J.

Example 3

The same energy absorption device as that of Example 1 except that the angle between the pendulum of hammer impact and the lengthwise (axial) direction of the long part was 90 degrees, was used to test as described for Example 1.

The result was almost the same as in Example 1. The columns 2 only were progressively compressed and failed, and stopped the hammer, absorbing all the energy.

Example 4

An energy absorption device having one long part, two pairs of columns, two pairs of upper platens and two pairs of lower platens was prepared as described for Example 1, except that the long part 1 was a steel pipe (length 1000 mm, diameter 30 mm, thickness 1 mm, failure load strength 91 kN) threaded at both the ends, and that the columns were hexagonal columns made of aluminum (6063 alloy) (wall thickness 1.1 mm, height 120 mm, axial compressive buckling failure load 20 kN).

At the ⅓ point leftward from the center of the long part of the device having the above-mentioned impact energy absorption structural system, a hammer impact (hammer speed 36 km/h) of 2200 J was applied in pendulum motion in the direction of 45 degrees against the lengthwise (axial) direction of the long part using the same impact testing machine as that used in Example 1.

As a result, the steel long part 1 was bending-deformed, and at the same time, the aluminum columns were compressively buckled and failed at portions between the upper platens and the lower platens. Furthermore, the bending-deformed steel long part was further tension-deformed, being necking-deformed, to stop the hammer.

INDUSTRIAL APPLICABILITY

The conventional column type energy absorption member is weak against an impact applied in a direction within a wide angle (θ) such as an impact applied in an oblique direction. However, the energy absorption device of this invention can exhibit impact energy absorption capability even against an impact applied in the direction within such a wide angle, more than that in the case where it fails in the axial direction. Furthermore, even if the parts used are damaged, they can be easily exchanged to allow restoration as an energy absorption device.

Therefore, this invention can absorb the energy for protecting the passengers of transportation equipment such as a motor vehicle more safely at lower cost, and can contribute to the improvement of transportation equipment and the like in safety and environment aspect.

That is, the energy absorption device of this invention has a structural system capable of very efficiently absorbing the energy of an impact force applied in a wide angle, and can be used most suitably for the transportation equipment requiring safety, light weight and space saving, for example, motor vehicles such as passenger cars, trucks and light vehicles, aircraft such as passenger planes, ships such as fishing boats and ferry boats, and rolling stock such as electric trains, monorail trains and cable cars. Furthermore, it can be used also as an impact energy absorbing device in dwelling houses and buildings likely to be hit by such transportation equipment.

The invention claimed is:

1. An impact energy absorption device, comprising: a single elongated part made of a high strength material, at least one column having upper and lower faces disposed to substantially surround the elongated part, and an upper platen and a lower platen disposed to keep the upper and lower faces of the column between the platens and to cover the upper and lower faces of the column respectively, the upper platen being attached to each end of the elongated part, the elongated part, the at least one column and the upper and lower platens being so configured and connected relative to each other so as to constitute a structural system in which a deformation of the elongated part caused by an impact force applied to it causes the upper platen and the lower platen to move toward each other and contact the upper and lower faces of the column, respectively, in planes, thus compressively deforming the at least one column to absorb the impact energy of the impact force.

2. An impact energy absorption device according to claim 1, wherein the tensile failure load of the elongated part is 1.1 times to 30 times the compressive failure load of the column, and the compressive failure load of the upper platen is 1.1 times to 50 times the compressive failure load of the column.

3. An impact energy absorption device according to claim 1, wherein the compressive failure load of the lower platen is 1.1 times to 50 times the compressive failure load of the column.

4. An impact energy absorption device according to claim 1, 2 or 3, wherein the compressive failure loads of the upper platen and the lower platen are 1.1 times to 20 times the tensile failure load of the elongated part.

5. An impact energy absorption device according to claim 1, 2 or 3, wherein the elongated part is a rope, tube or belt member.

6. An impact energy absorption device according to claim 1, 2 or 3, wherein the elongated part is made of a metal or fiber reinforced plastic having a strength of 1 GPa or more.

7. An impact energy absorption device according to claim 1, 2 or 3, where the length of the elongated part is 10 cm to 100 m.

8. An impact energy absorption device according to claim 1, 2 or 3, wherein the column is a cylinder or solid shaft made of a metal or fiber reinforced plastic.

9. An impact energy absorption device according to claim 1, wherein the column is hollow.

10. An impact energy absorption device according to claim 1, wherein the column is solid.

11. An impact energy absorption device according to claim 1, wherein the ends of the elongated part are attached to the upper platen with a threaded connection.

\* \* \* \* \*